United States Patent [19]

Matsuo et al.

[11] 3,957,522
[45] May 18, 1976

[54] PROCESS FOR PREPARING FIRE-RESISTING MOLDINGS

[75] Inventors: Masato Matsuo, Toyonaka; Hiroki Yamakita, Hirakata, both of Japan

[73] Assignee: Nippon Gohsei Kagaku Kogyo Kabushiki Kaisha, Osaka, Japan

[22] Filed: Apr. 10, 1974

[21] Appl. No.: 459,724

[30] Foreign Application Priority Data
  Apr. 24, 1973  Japan............................... 48-47458
  Nov. 29, 1973  Japan............................. 48-135040

[52] U.S. Cl.............................. 106/109; 106/38.3; 106/76; 106/77; 264/87; 264/333
[51] Int. Cl.² ...................... C04B 11/00; B28B 1/26
[58] Field of Search ................ 106/76, 77, 85, 89, 106/63, 64, 109, 38.3; 264/63

[56] References Cited
UNITED STATES PATENTS

| | | | |
|---|---|---|---|
| 2,531,496 | 11/1950 | Bean et al. | 106/77 |
| 3,841,886 | 10/1974 | Burr | 106/63 |

*Primary Examiner*—Donald J. Arnold
*Assistant Examiner*—John Parrish
*Attorney, Agent, or Firm*—Armstrong, Nikaido & Wegner

[57] ABSTRACT

A process for preparing fire-resisting moldings having an improved mechanical strength by admixing gypsum with crystalline calcium silicate in an amount of 5 to 100 % by weight to the gypsum and water to give a slurry, molding the slurry under pressure and drying the raw articles. The water resistance of the moldings can be improved by the further addition of cement.

5 Claims, No Drawings ent invention relates to improved gypsum moldings having an improved mechanical strength and fire-resisting property, and to a process for preparing thereof.

PROCESS FOR PREPARING FIRE-RESISTING MOLDINGS

BACKGROUND OF THE INVENTION

The present invention relates to improved gypsum moldings having an improved mechanical strength and fire-resisting property, and to a process for preparing thereof.

Gypsum can be obtained cheaply almost all over the world and moldings thereof have a comparatively high strength at a normal temperature, so gypsum moldings have been used for building materials, e.g. a panel and a block for wall and ceiling.

However, gypsum moldings have a high bulk density and poor fire-resisting property, that is, when heated at high temperature, their mechanical strength such as bending strength or compressive strength decreases exceedingly and shrinkage, deformation or crack often occurs.

Therefore, such gypsum moldings are not applicable to the use of modern building materials which require light bulk density and superior heat insulating property.

There has been proposed a process for improving a mechanical strength of moldings made of gypsum by admixing a reinforcing material, for instance, cellulose fiber, mineral fiber such as asbestos or rock wool, or perlite into gypsum, but such a process is insufficient to improve fire-resisting property of moldings.

OBJECTS OF THE INVENTION

It is an object of the present invention to provide novel fire-resisting moldings including gypsum as a main component.

Further object of the invention is to provide fire-resisting moldings having improved mechanical strength and fire-resisting property.

More further object of the invention is to provide fire-resisting moldings having improved water resistance in addition to improved mechanical strength and fire-resisting property and being usable as building materials not only for interior but also for exterior.

Still further object of the invention is to provide processes for preparing the above-mentioned fire-resisting moldings.

These and other objects will become apparent from the description hereinafter.

DETAILED DESCRIPTION

It has not been found that the above-mentioned objects are accomplished by incorporating crystalline calcium silicate into gypsum in a specific amount. The fire-resisting moldings having a large mechanical strength can be obtained by admixing gypsum with crystalline calcium silicate and water, molding the obtained slurry under pressure and drying the raw shaped articles. The obtained moldings have low bulk density compared with conventional moldings made of gypsum. According to the present invention, a fire-resisting property, which is the greatest defect of conventional moldings made of gypsum, is improved.

It has also been found that the addition of cement to the above-mentioned ingredients improves water resistance of the instant fire-resisting moldings.

As crystalline calcium silicate employed in the present invention, there may be employed known crystalline calcium silicates obtained by subjecting silica component such as siliceous sand or diatomaceous earth, calcium source such as quick lime or slaked lime, and water to hydrothermal reaction at a high temperature under a high pressure. Crystalline calcium silicates employed in the present invention include xonotlite ($6CaO.6SiO_2.H_2O$) and tobermolite ($5CaO.6SiO_2.5H_2O$), which can be optionally prepared by selecting conditions of the hydrothermal reaction. Particularly, tobermolite has the advantages that starting materials can be selected from a wide range and the hydrothermal reaction can be carried out under moderate conditions.

It is disadvantageous to prepare fire-resisting moldings from crystalline calcium silicate alone by reason that crystalline calcium silicate comes expensive since it requires high temperature- and high pressure-reaction in production thereof and thus the continuous production is impossible, and also considerably high molding pressure is required in order to prepare moldings having a practical mechanical strength. In accordance with the present invention, however, a molding having a large mechanical strength can be obtained under a relatively low pressure by incorporating crystalline calcium silicate into gypsum.

Examples of gypsum employed in the present invention are natural gypsum, calcined gypsum of $\alpha$-type and $\beta$-type, and soluble anhydrous-gypsum having a hydraulic property.

In carrying out the present invention, it is suitable to employ crystalline calcium silicate at the ratio of 5 to 100% by weight, preferably 10 to 40% by weight to gypsum. In case the amount of crystalline calcium silicate is less than 5% by weight to gypsum, a fire-resisting property and a heat insulating property of the obtained molding can not be substantially improved. On the other hand, in case the amount is more than 100% by weight to gypsum, the specific strength which is the ratio of bending strength or compressive strength to bulk density lowers and also extremely high molding pressure is required to obtain the practical moldings.

Gypsum and crystalline calcium silicate are admixed with water to give a slurry. Though the amount of water is not especially limited in theory, it is usually selected from the range of 2.5 to 5 times the total solid content, preferably 3 to 4 times the total solid content since molding becomes difficult when the amount is in excess.

Thus obtained slurry is poured into a mold and molded under a proper pressure to give a raw shaped article, and the raw article is then dried. The bulk density and mechanical strength of the obtained molding depend on molding pressure. The higher pressure, the higher mechanical strength can be obtained. The pressure is selected from the range of 3 to 50 kg./cm$^2$. Usually, a practical molded article is obtained even under a pressure of 3 to 20 kg./cm$^2$. The molding may be carried out by a known molding manner such as pressing, extruding or casting.

Though the conditions for drying a raw shaped article varies in accordance with form and size thereof, the drying should be carried out at a temperature of not more than 100°C. Usually, the raw article is dried at a temperature of 70° to 80°C. for 15 to 24 hours in an atmosphere of circulated hot air. As the other drying method, there may be employed dielectric drying or microwave drying, which can reduce the time of drying.

In accordance with the present invention, for the purpose of reinforcing mechanical strength, there may be preferably added a filler such as cellulose fiber, asbestos, glass fiber, perlite or clay besides crystalline calcium silicate.

In case of further incorporating cement into gypsum together with crystalline calcium silicate and water, the obtained moldings are applicable to not only building materials for interior but also building materials for exterior since a water resistance of the moldings is extremely increased. In that case, cement is employed at the ratio of 10 to 30% by weight to a total amount of gypsum and crystalline calcium silicate, preferably 10 to 20% by weight to the total amount. In case the amount is less than the above range, remarkable improvement of water resistance is not expected. On the other hand, in case of more than the above range, the bulk density increases and a fire-resisting property is reduced. As a cement employed in the present invention, there can be employed known cements such as portland cement, blast furnace cement, alumina cement, and the like.

The present invention is more particularly described and explained by means of the following illustrative Examples.

EXAMPLE 1

Powdery siliceous sand was admixed with quick lime at the molar ratio of 1 : 1.05 as $SiO_2$ : $CaO$, and then the obtained mixture was added with water in an amount of 12 times the total weight of the mixture and blended to give a slurry. An autoclave was charged with the slurry and the hydrothermal reaction was carried out at a temperature of 220°C. for 4 hours to give xonotlite.

Thus obtained xonotlite was admixed with powders of commercial gypsum at the ratios as shown in the following Table 1. The obtained mixture was further added with asbestos and water in an amount of 5% by weight to the mixture and of 300% by weight to the mixture, respectively, and was agitated to give a slurry. The slurry was then poured into a mold made from mild steel and pressed with removing water under the pressure shown in Table 1. Then, the raw shaped article was taken out from the mold and dried at a temperature of 100°C. for 24 hours to give a board having a thickness of 2 cm.

The results of the measurement of mechanical strength of the boards by testing machine (Autograph made by Shimadzu Seisakusho Ltd.) were shown in Table 1.

Bending strength was measured on the test piece of 2 × 2 × 10 cm. under the conditions of a span distance of 7 cm. and a rate of loading of crosshead of 0.25 mm./min.

Compressive strength was measured on the test piece of 2 × 2 × 2 cm. under the condition of a rate of loading of crosshead of 1.0 mm./min.

Table 1

| Ratio of crystalline calcium silicate to gypsum (by weight) Xonotlite : Gypsum | Molding pressure kg./cm.² | Bulk density g./cc. | Bending strength kg./cm.² | Specific bending strength Bending strength / Bulk density | Compressive strength kg./cm.² | Specific compressive strength Compressive strength / Bulk density |
|---|---|---|---|---|---|---|
| 1 : 9 | 13 | 0.91 | 57.0 | 62.6 | 62.5 | 68.6 |
|  | 35 | 1.12 | 92.7 | 82.8 | 116 | 104 |
|  | 50 | 1.23 | 117 | 95.1 | 147 | 120 |
| 2 : 8 | 13 | 0.83 | 64.6 | 77.8 | 64.9 | 78.2 |
|  | 35 | 1.06 | 105 | 99.1 | 110 | 104 |
|  | 50 | 1.18 | 139 | 118 | 150 | 127 |
| 3 : 7 | 13 | 0.68 | 37.3 | 54.9 | 46.5 | 68.4 |
|  | 35 | 0.87 | 62.5 | 71.8 | 84.8 | 97.5 |
|  | 50 | 0.98 | 78.4 | 80.0 | 108 | 110 |
| 5 : 5 | 13 | 0.56 | 29.6 | 52.9 | 27.2 | 48.6 |
|  | 35 | 0.77 | 59.9 | 77.8 | 68.9 | 89.5 |
|  | 50 | 0.88 | 78.8 | 89.5 | 84.6 | 96.1 |
| 0 : 10 | 13 | 1.37 | 89.6 | 65.4 | 76.4 | 55.8 |
|  | 35 | 1.57 | 162 | 103 | 350 | 223 |
|  | 50 | 1.72 | 193 | 112 | 485 | 282 |
| 7 : 3 | 13 | 0.46 | 19.7 | 42.8 | 21.1 | 45.9 |
|  | 35 | 0.60 | 38.0 | 63.3 | 43.6 | 72.7 |
|  | 50 | 0.67 | 48.6 | 70.3 | 59.5 | 88.8 |
| 10 : 0 | 13 | 0.30 | 7.1 | 23.7 | 13.8 | 46.0 |
|  | 35 | 0.35 | 28.1 | 80.3 | 31.0 | 88.6 |
|  | 50 | 0.45 | 41.0 | 91.1 | 48.2 | 107 |

Further, a fire-resisting property was estimated by the following manner. The board cut into the size of 2 × 2 × 10 cm. was put in a electric furnace and heated. The temperature was elevated to 750° to 800°C. from a room temperature for the first one hour and further elevated to 1,000°C. for next one hour, and then maintained at a temperature of 1,000° to 1,050°C. for further next 2 hours. After the conclusion of the heating, the board was taken out and the physical properties thereof were measured.

The results were shown in Table 2.

Table 2

| Ratio of crystalline calcium silicate to gypsum (by weight) Xonotlite : Gypsum | Bulk density g./cc. | Ratio of linear shrinkage % | Ratio of weight loss % | Ratio of drop of bending strength % | Appearance |
|---|---|---|---|---|---|
| 2 : 8 | 0.83 | 1.2 | 17.8 | 83.1 | no crack, no deformation |
|  | 1.06 | 1.2 | 17.2 | 86.8 | ditto |
|  | 1.18 | 1.1 | 16.2 | 85.0 | ditto |
| 3 : 7 | 0.68 | 1.3 | 13.2 | 80.4 | no crack, no deformation |
|  | 0.95 | 1.3 | 11.8 | 80.6 | ditto |
|  | 0.93 | 1.2 | 11.0 | 78.6 | ditto |
| 0 : 10 | 1.24 | — | — | — | breakdown |
|  | 1.57 | — | — | — | generation of crack |

Table 2-continued

| Ratio of crystalline calcium silicate to gypsum (by weight) Xonotlite : Gypsum | Bulk density g./cc. | Ratio of linear shrinkage % | Ratio of weight loss % | Ratio of drop of bending strength % | Appearance |
| --- | --- | --- | --- | --- | --- |
|  | 1.72 | 2.5 | 20.0 | 98.3 | generation of crack |
|  | 0.46 | 1.2 | 10.6 | 45.8 | no crack, no deformation |
| 7 : 3 | 0.60 | 1.1 | 10.0 | 50.9 | ditto |
|  | 0.67 | 1.3 | 11.3 | 49.2 | ditto |

EXAMPLE 2

Powdery siliceous sand was admixed with quick lime at the molar ratio of 1.3 : 1 as $SiO_2$ : $CaO$, and then the obtained mixture was added with water in an amount of 10 times the total weight of the mixture and blended to give a slurry. An autoclave was charged with the slurry and the hydrothermal reaction was carried out at a temperature of 180°C. for 4 hours to give tobermolite.

Thus obtained tobermolite was admixed with powders of commercial gypsum at the ratios as shown in the following Table 3, and thereto further added with asbestos and water in an amount of 5% by weight to the mixture and of 370% by weight to the mixture, respectively, and was agitated to give a slurry. The slurry was poured into a mold made from mild steel and pressed with removing water. Then, the raw shaped article was taken out from the mold and dried at a temperature of 100°C. for 24 hours to give a board having a thickness of 2 cm.

The results of the measurement of mechanical strength of the boards by the same manner as in Example 1 were shown in Table 3.

Table 3

| Ratio of crystalline calcium silicate to gypsum (by weight) Tobermolite : Gypsum | Molding pressure kg./cm.² | Bulk density g./cc. | Bending strength kg./cm.² | Specific bending strength Bending / Bulk strength density | Compressive strength kg./cm.² | Specific compressive strength Compressive / Bulk strength density |
| --- | --- | --- | --- | --- | --- | --- |
|  | 13 | 0.74 | 64.0 | 86.5 | 68.6 | 92.7 |
| 2 : 8 | 35 | 0.98 | 101 | 103 | 133 | 136 |
|  | 50 | 1.13 | 120 | 106 | 157 | 139 |
|  | 13 | 0.64 | 43.1 | 67.4 | 46.3 | 72.3 |
| 3 : 7 | 35 | 0.93 | 75.7 | 81.4 | 97.9 | 105 |
|  | 50 | 1.10 | 87.8 | 79.8 | 103 | 93.6 |
|  | 13 | 0.56 | 27.1 | 48.4 | 38.1 | 68.0 |
| 4 : 6 | 35 | 0.84 | 53.3 | 63.5 | 82.0 | 97.6 |
|  | 50 | 0.99 | 68.3 | 69.0 | 103 | 104 |
|  | 13 | 0.37 | 10.4 | 28.1 | 15.5 | 41.9 |
| 10 : 0 | 35 | 0.42 | 32.9 | 78.3 | 43.6 | 104 |
|  | 50 | 0.46 | 42.1 | 91.5 | 52.1 | 113 |
|  | 13 | 0.49 | 17.7 | 36.1 | 23.5 | 48.0 |
| 7 : 3 | 35 | 0.64 | 44.6 | 69.7 | 51.9 | 81.1 |
|  | 50 | 0.70 | 50.1 | 71.6 | 68.2 | 97.4 |

Further, a fire-resisting property was estimated by the same manner as in Example 1. The results were shown in Table 4.

Table 4

| Ratio of crystalline calcium silicate to gypsum (by weight) Tobermolite : Gypsum | Bulk density g./cc. | Ratio of linear shrinkage % | Ratio of weight loss % | Ratio of drop of bending strength % | Appearance |
| --- | --- | --- | --- | --- | --- |
|  | 0.74 | 1.3 | 16.4 | 73.8 | no crack, no deformation |
| 2 : 8 | 0.98 | 1.6 | 16.3 | 70.0 | ditto |
|  | 1.13 | 1.3 | 16.3 | 81.3 | ditto |
|  | 0.64 | 1.5 | 16.2 | 74.0 | no crack, no deformation |
| 3 : 7 | 0.93 | 1.3 | 16.0 | 86.1 | ditto |
|  | 1.10 | 1.1 | 16.1 | 72.5 | ditto |
|  | 0.37 | 1.2 | 10.6 | 18.0 | no crack, no deformation |
| 10 : 0 | 0.42 | 1.0 | 11.3 | 20.7 | ditto |
|  | 0.46 | 1.0 | 10.0 | 22.5 | ditto |
|  | 0.49 | 1.2 | 12.9 | 53.4 | no crack, no deformation |
| 7 : 3 | 0.64 | 1.2 | 13.4 | 48.7 | ditto |
|  | 0.70 | 1.1 | 13.8 | 47.6 | ditto |

EXAMPLE 3

The same procedures as in Examples 1 and 2 were repeated except that portland cement was further added to the mixture of gypsum, crystalline calcium silicate and water.

The results of the measurement of mechanical property and fire-resisting property were shown in Table 5.

Water absorption was measured by putting a sample into water at normal temperature to be saturated with water, measureing increase of weight and calculating the ratio of increase of weight to the original weight of the sample.

Table 5

| Ratio of crystalline calcium silicate, gypsum and cement by weight ratio | Molding pressure kg./cm.$^2$ | Bulk density g./cc. | Bending strength kg./cm.$^2$ | Compressive strength kg./cm.$^2$ | Ratio of linear shrinkage % | Water absorption % | Bending strength after absorbing water kg./cm.$^2$ |
|---|---|---|---|---|---|---|---|
| Xonotlite : Gypsum : Cement 2 : 7 : 1 | 13 | 0.83 | 68.2 | 72.6 | 1.1 | 48 | 45.2 |
| Xonotlite : Gypsum : Cement 2 : 6 : 2 | 13 | 0.82 | 68.4 | 99.0 | 1.3 | 43 | 49.9 |
| Tobermolite : Gypsum : Cement 2 : 7 : 1 | 13 | 0.72 | 67.3 | 96.4 | 1.2 | 51 | 46.7 |
| Tobermolite : Gypsum : Cement 2 : 6 : 2 | 13 | 0.74 | 69.6 | 123 | 1.3 | 45 | 50.6 |
| Xonotlite : Gypsum : Cement 2 : 8 : 0 | 13 | 0.83 | 64.6 | 64.9 | 1.2 | 91 | 26.9 |

What we claim is:

1. A process for preparing fire-resisting moldings which comprises admixing gypsum with (i) a member selected from the group consisting of hydrothermally prepared xonotlite and tobermolite and mixtures of these in an amount of 5 to 100% by weight to said gypsum, and (ii) water to give a slurry; molding said slurry under pressure; and drying the resultant raw-shaped article.

2. The process of claim 1, wherein the pressure is selected from the range of 3 to 50 kg./cm.$^2$ and the drying is carried out at a temperature of not more than 100°C.

3. The process of claim 1, in which cement selected from the group consisting of portland cement, blast furnace cement, and alumina cement in an amount of 10 to 30% by weight based on the total amount of gypsum and member (i) is admixed therewith.

4. A fire-resisting molding prepared by the process of claim 1.

5. A fire-resisting molding prepared by the process of claim 3.

* * * * *